US012494592B2

(12) United States Patent
Bar Shalom et al.

(10) Patent No.: US 12,494,592 B2
(45) Date of Patent: Dec. 9, 2025

(54) THREE-DIMENSIONAL ANTENNA ARRAY SYSTEM

(71) Applicant: GM GLOBAL TECHNOLOGY OPERATIONS LLC, Detroit, MI (US)

(72) Inventors: Ofer Bar Shalom, Kiryat Ono (IL); Ofer Givati, Hertzliya (IL); Igal Kotzer, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 18/342,003

(22) Filed: Jun. 27, 2023

(65) Prior Publication Data

US 2025/0007183 A1 Jan. 2, 2025

(51) Int. Cl.
*H01Q 1/32* (2006.01)
*H01Q 21/29* (2006.01)

(52) U.S. Cl.
CPC ............... *H01Q 21/29* (2013.01); *H01Q 1/32* (2013.01)

(58) Field of Classification Search
CPC .... H01Q 21/29; H01Q 21/32; H01Q 21/0006; H01Q 3/267; G01S 7/40; G01S 7/4021
See application file for complete search history.

(56) References Cited

U.S. PATENT DOCUMENTS

2009/0267835 A1 10/2009 Tietjen
2019/0312349 A1* 10/2019 Logothetis ............. H01Q 21/28
2022/0158343 A1* 5/2022 Hassan .................. H01Q 3/247

FOREIGN PATENT DOCUMENTS

DE 102019123282 A1 3/2020
DE 102022120231 A1 3/2023

* cited by examiner

*Primary Examiner* — Awat M Salih
(74) *Attorney, Agent, or Firm* — Quinn IP Law

(57) ABSTRACT

A three-dimensional (3D) antenna array system in the form of a phased array antenna having a first antenna array and a second antenna array, a calibration circuit including an external signal generator, and a hinged power transformer is described. The external signal generator is electrically connected to the first antenna array, and the first antenna array is electrically coupled to the second antenna array via the hinged power transformer. The hinged power transformer mechanically joins the first antenna array to the second antenna array in one of a first position and a second position, with the first antenna array being disposed at an angle in relation to the second antenna array when the hinged power transformer is disposed in the first position.

20 Claims, 3 Drawing Sheets

THREE-DIMENSIONAL ANTENNA ARRAY SYSTEM

INTRODUCTION

On-vehicle radar systems may be employed to detect and locate other vehicles, pedestrians and fixed or moving objects when deployed on ground vehicles.

Antenna arrays that may be found in various applications such as radar, experimental data collection and so on, and need to operate coherently in time, frequency and phase. Due to changing conditions (such as ambient temperature, humidity levels, components aging etc.), regular calibration of time, gain and phase of the transmit-receive chains of the system array is necessary.

Accurate calibration of phase, gain, frequency and related parameters is essential for applying array processing algorithms to estimate radar parameters such as directions of arrival, time delay, Doppler shift etc. Known methods for calibrating an antenna array requires a dedicated setup that may include disconnecting or performing another intrusive action to the antennas to inject a calibration signal. Furthermore, automotive radar systems may be calibrated only once during vehicle production. However, during normal system operation, radar systems installed at different locations on a vehicle may experience different ambient temperatures. For example, one portion of a radar system may be facing the sun while another portion is in the shade, creating a temperature differential. In such scenarios temperature-attributed phase differences may be manifested and affect the overall radar performance.

In some cases, antenna arrays have three-dimensional (3D) shapes to improve their spatial resolution in azimuth, elevation or both. An antenna arranged with a 3D array that is composed of several antenna boards where one board or an assembly is rotated at an angle relative to a main board. Such arrangements may pose a special electro-mechanical challenge in their calibration, when it is necessary to drive the calibration signal to an adjacent antenna array (e.g., PCB) that is posed at an angle to a main board.

SUMMARY

The concepts described herein provide a three-dimensional (3D) antenna array for a vehicle that has a hinged configuration that enables and facilitates real-time phase and gain calibration. The real-time phase and gain calibration is executed to account for changes in parameters that may occur due to aging and/or real time variations in environmental effects.

An aspect of the disclosure may include a three-dimensional (3D) antenna array system in the form of a phased array antenna having a first antenna array and a second antenna array, a calibration circuit including an external signal generator, and a hinged power transformer. The calibration circuit is electrically connected to the first antenna array, and the first antenna array is electrically coupled to the second antenna array via the hinged power transformer. The hinged power transformer mechanically joins the first antenna array to the second antenna array in one of a first position and a second position, with the first antenna array being disposed at an angle in relation to the second antenna array when the hinged power transformer is disposed in the first position.

Another aspect of the disclosure may include the first antenna array being disposed in a horizontal plane and the second antenna array is disposed in a vertical plane when the hinged power transformer is disposed in the first position.

Another aspect of the disclosure may include the hinged power transformer electrically coupling the first antenna array to the second antenna array when the hinged power transformer is disposed in the first position.

Another aspect of the disclosure may include the external signal generator generating a pilot signal, the pilot signal being conducted to the first antenna array, and the hinged power transformer conducting the pilot signal to the second antenna array when the hinged power transformer is disposed in the first position.

Another aspect of the disclosure may include the pilot signal being a short-term radiofrequency (RF) signal having a continuous sine wave.

Another aspect of the disclosure may include the hinged power transformer including a primary winding, a secondary winding, and a ferrite core.

Another aspect of the disclosure may include the ferrite core including a first end and a second end, when the first end is coupled to the second end via a hinge.

Another aspect of the disclosure may include the primary winding being arranged on the first end of the ferrite core, and the secondary winding being arranged on the second end of the ferrite core.

Another aspect of the disclosure may include the hinged power transformer including a primary winding and a secondary winding, wherein the primary winding and the secondary winding are arranged in parallel and spirally wound around a common core element.

Another aspect of the disclosure may include the hinged power transformer having a non-ferrite core.

Another aspect of the disclosure may include the primary winding being arranged to rotate on the common core element in relation to the secondary winding.

Another aspect of the disclosure may include the hinged power transformer including a plurality of primary windings having a first quantity of turns, and a plurality of secondary windings having a second quantity of turns.

Another aspect of the disclosure may include the first quantity of turns is equal to the second quantity of turns.

Another aspect of the disclosure may include the calibration circuit having a first power divider coupled, via a first directional coupler, to the first antenna array; and a second power divider coupled, via a second directional coupler, to the second antenna array.

Another aspect of the disclosure may include a controller in communication with the calibration circuit and the external signal generator; wherein the controller is arranged to inject, via the external signal generator and the calibration circuit, a pilot signal into the first antenna array and into the second antenna array.

Another aspect of the disclosure may include an antenna array system that includes a phased array antenna including a first antenna array and a second antenna array, a calibration circuit including an external signal generator, a hinge, and a hinged power transformer; wherein the hinge mechanically joins the first antenna array to the second antenna array in one of a first position and a second position; wherein the first antenna array is disposed at an angle in relation to the second antenna array when the hinged power transformer is disposed in the first position; wherein the calibration circuit is electrically connected to the first antenna array; and wherein the first antenna array is electrically coupled to the second antenna array via the hinged power transformer.

Another aspect of the disclosure may include an antenna array system that includes a phased array antenna including a first antenna array and a second antenna array, a calibration circuit including an external signal generator, a hinge, and a hinged power transformer. The hinge mechanically joins the first antenna array to the second antenna array in one of a first position and a second position. The first antenna array is disposed in a horizontal plane, and the second antenna array is disposed in a vertical plane when in the first position, and is disposed in a horizontal plane when in the second position. The external signal generator of the calibration circuit is directly electrically connected to the first antenna array, and is electrically coupled to the second antenna array via the hinged power transformer.

A system and method are described that enable dynamic in situ calibration of a radar system to accurately estimate radar parameters such as directions of arrival, time delay, Doppler shift etc., without disconnecting the antennas or undertaking another intrusive action.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

Figure 1:
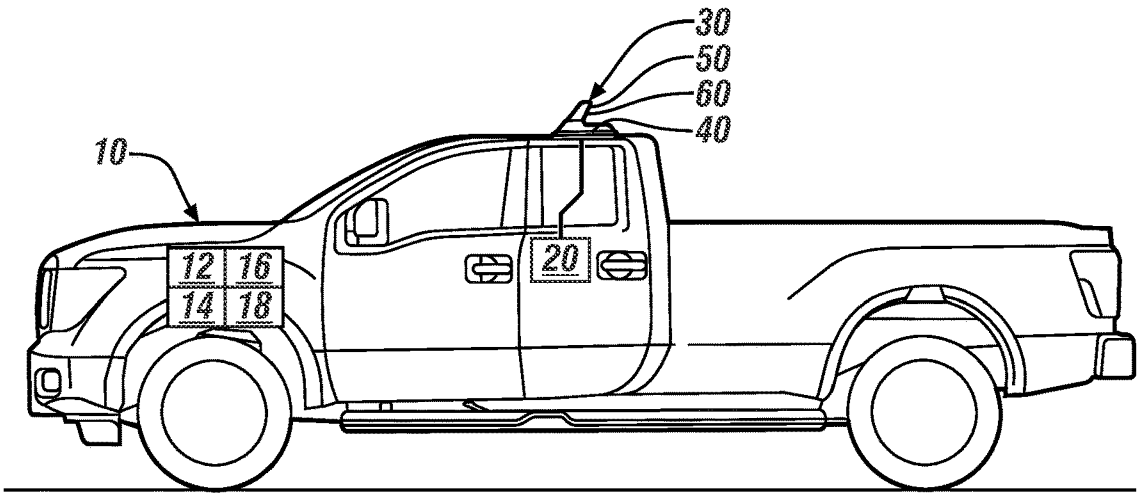
FIG. 1 schematically illustrates a vehicle having a radar system that includes a 3D antenna assembly, in accordance with the disclosure.

The drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Referring to the drawings, wherein like reference numerals correspond to like or similar components, FIGS. 1 through 5, consistent with embodiments disclosed herein, schematically illustrate elements of a vehicle 10 having a radar system 20 that includes a three-dimensional (3D) antenna assembly 30 having a first antenna array 40 and a second antenna array 50 that are mechanically joined and electrically connected employing a hinged power transformer 60. A dynamic calibration circuit 70 including external signal generator 71 is arranged to interact with the 3D antenna assembly 30 to dynamically calibrate the first antenna array 40 and the second antenna array 50 in-use. The vehicle 10 may include, but not be limited to a ground vehicle in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 10 advantageously includes a drivetrain 12, a telematics system 14, and a navigation system 16, and may also include an advanced driving assistance system (ADAS) 18 that provides a level of autonomous vehicle control.

The 3D antenna assembly 30 includes, in one embodiment, the first antenna array 40 arranged at an angle relative to the second antenna array 50 when in use. The external signal generator 71 is employed to generate and conduct a radiofrequency (RF) pilot signal, which is employed by the dynamic calibration circuit 70 to dynamically calibrate the first and second antenna arrays 40, 50 of the 3D antenna assembly 30 in-use. The hinged power transformer 60 may be implemented using metal coils, which may form a hinge that facilitates folding of the 3D antenna assembly 30 to reduce its profile under certain conditions, such as when entering a parking facility. The concepts described herein facilitate a calibration process that includes regular and/or periodic calibration of the phase and gain parameters without requiring disablement of the array reception for calibration. The calibration process includes injecting the RF pilot signal to all the receive paths, which need to act coherently in terms of time, phase, etc.

The radar system 20 provides information related to location and trajectory of vehicles, pedestrians and other objects proximal to the vehicle 10, with such information being communicated to the ADAS 18 for its use, which may include informing the operator and autonomously controlling the vehicle 10.

The ADAS 18 includes, in one embodiment, an on-vehicle control system that is capable of providing a level of driving automation. The 'operator' describes the person responsible for directing operation of the vehicle 10, whether actively involved in controlling one or more vehicle functions or directing autonomous vehicle operation. Driving automation can include various dynamic driving and vehicle operations. Driving automation can include some level of automatic control or intervention related to a single vehicle function, such as steering, acceleration, and/or braking, with the operator continuously having overall control of the vehicle 10. Driving automation can include some level of automatic control or intervention related to simultaneous control of multiple vehicle functions, such as steering, acceleration, and/or braking, with the operator continuously having overall control of the vehicle. Driving automation can include simultaneous automatic control of vehicle driving functions, including steering, acceleration, and braking, wherein the operator cedes control of the vehicle 10 for a period of time during a trip. Driving automation can include simultaneous automatic control of vehicle driving functions, including steering, acceleration, and braking, wherein the operator cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like. The ADAS 18 includes one or a plurality of vehicle systems and associated controllers that provide a level of driving automation. The vehicle systems, subsystems and controllers associated with the ADAS 18 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The telematics system 14 is a communication system that is capable of extra-vehicle communication for communicating with a communication network system having wireless and wired communication capabilities. Extra-vehicle communication includes short-range vehicle-to-vehicle (V2V) communication and/or vehicle-to-everything (V2x) communication. This may include communication with an infrastructure monitor, e.g., a traffic camera, and communication to a proximal pedestrian, etc. Alternatively, or in addition, the telematics system 14 may be capable of short-range wireless communication to a handheld device, e.g., a cell phone, a satellite phone or another telephonic device. In one embodiment the handheld device is loaded with a software application that includes a wireless protocol to communicate with the telematics system 14, and the handheld device executes the extra-vehicle communication for communicating with an off-board controller via a communication network, which may be in the form of a satellite, a cell tower antenna, and/or another mode of communication. The telematics system 14 may also include a global position system (GPS) sensor that may be employed by the navigation system 16.

The on-vehicle radar system 20 may be configured as a multiple input/multiple output (MIMO) system that includes the 3D antenna assembly 30.

The 3D antenna assembly 30 is arranged as a phased array antenna that includes a first antenna array 40 and a second antenna array 50 that are mechanically joined and electrically connected employing a hinged power transformer 60. The external signal generator 71 of calibration circuit 70 is coupled to the first antenna array 40. The 3D antenna assembly 30 includes a transmitter array, a receiver array, dynamic calibration circuit 70, and a signal constructor controller 80. The elements of the on-vehicle radar system 20 may be configured to operate as a non-linear-frequency-modulated (NLFM) system in one embodiment. The transmit frequency and related operating parameters for the NLFM system are selected to achieve desired values for range, range resolution, angular resolution, and velocity resolution for the expected operating environment of the vehicle 10. The NLFM system is arranged to generate and transmit tansec waveforms, which resolve beam skew error by compensating for additional phase variation beam skew error.

In one embodiment, the first antenna array 40 is arranged in a horizontal position on-vehicle, and the second antenna array 50 may be arranged in either a horizontal position (when stowed) or a vertical position (when active).

The hinged power transformer 60 facilitates mechanical folding of the second antenna array 50 and also facilitates real-time calibration of phase and gain parameters of each path via the calibration circuit 70, online, without requiring disabling the array reception for its calibration.

The 3D antenna assembly 30 includes one or more assemblies rotated at an angle relative to each other. The hinged power transformer 60 is employed to feed the RF pilot signal from the calibration circuit 70 to adjacent assemblies and boards. The hinged power transformer 60 may be implemented using metal coils, which form a hinge that may enable folding the 3D antenna assembly 30 when needed.

Figure 2:
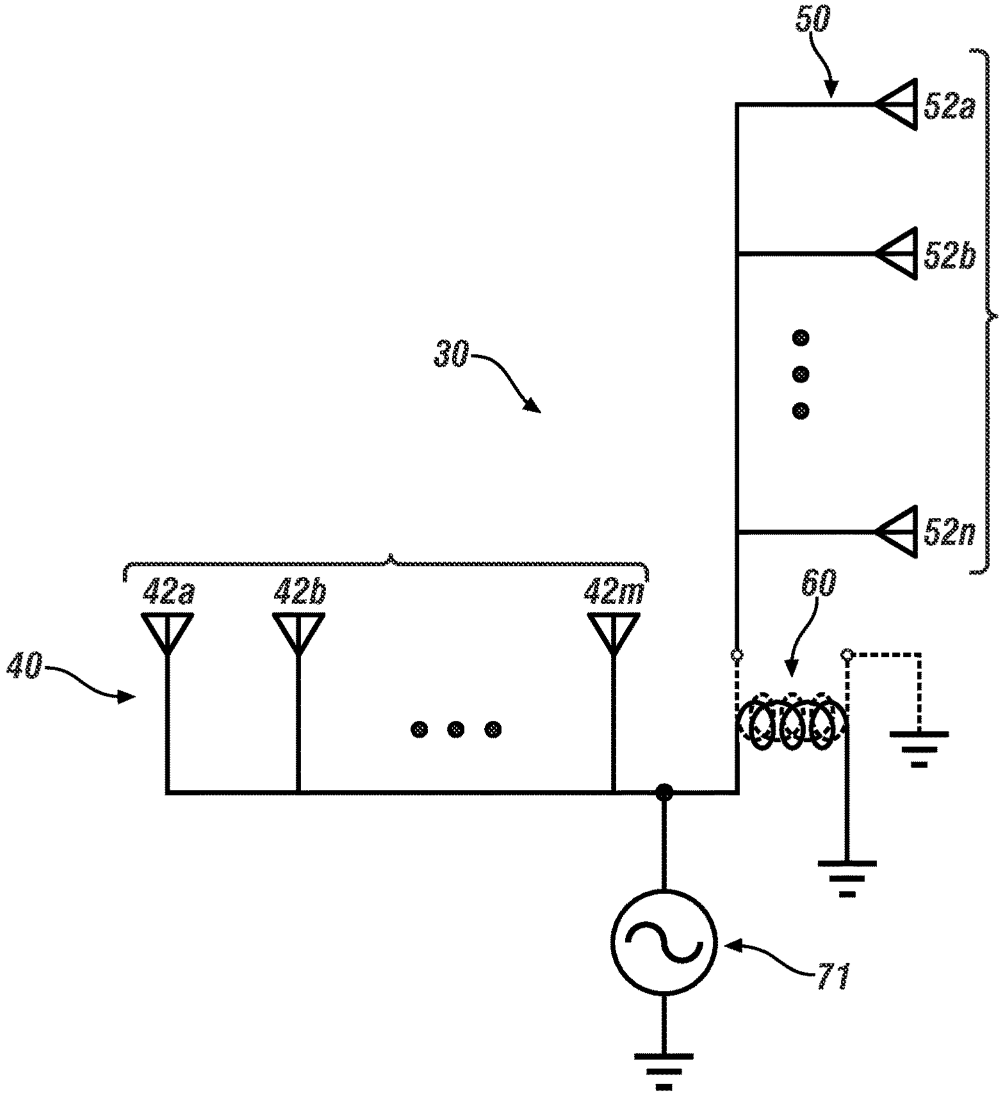
FIG. 2 schematically illustrates an embodiment of a 3D antenna assembly, including a first antenna array, second antenna array, and a hinged power transformer, in accordance with the disclosure.

FIG. 2 schematically illustrates an embodiment of the 3D antenna assembly 30, including the first antenna array 40, the second antenna array 50, hinged power transformer 60, and external signal generator 71 of the calibration circuit 70.

The first antenna array 40 includes a first plurality of antennas 42*a*, 42*b*, . . . $\mathbf{42}_m$, which are arranged in a nominal horizontal plane, and are all electrically connected to the calibration circuit 70.

The second antenna array 50 includes a second plurality of antennas 52*a*, 52*b*, . . . 52*n*, which are arranged in a nominal vertical plane, and are all electrically connected to the external signal generator 71 via the hinged power transformer 60.

Figure 3:
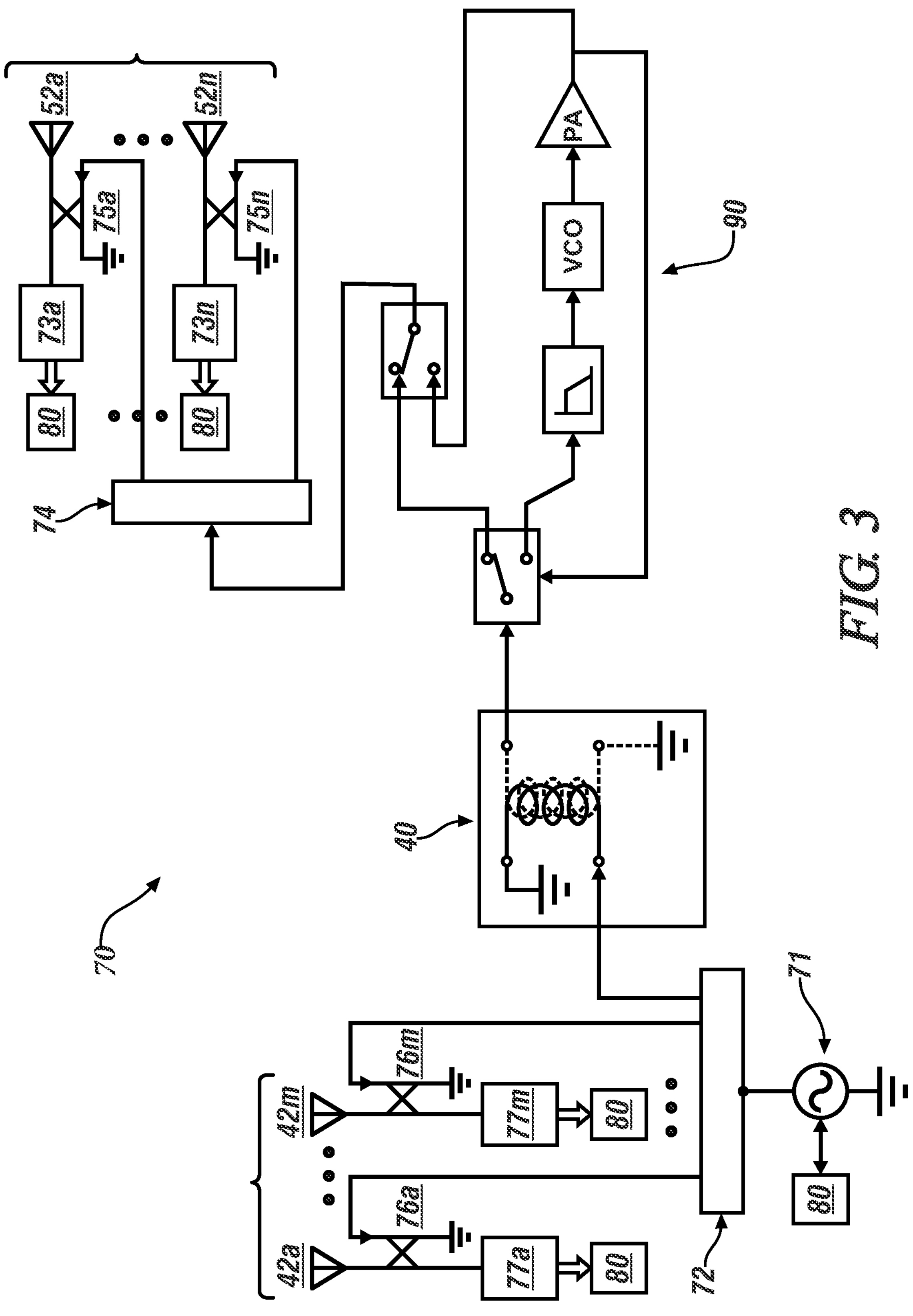
FIG. 3 schematically illustrates an embodiment of a 3D antenna assembly, including a first antenna array, second antenna array, a hinged power transformer, and a calibration circuit, in accordance with the disclosure.

FIG. 3 schematically illustrates additional details related to an embodiment of the 3D antenna assembly 30, including the first antenna array 40, the second antenna array 50, hinged power transformer 60, and the calibration circuit 70.

The first antenna array 40 includes the first plurality of antennas 42*a*, . . . 42*m*, wherein 'm' represents the numerical quantity of the first plurality of antennas 42. The first plurality of antennas 42*a*, . . . 42*m* are all electrically connected to the calibration circuit 70. The calibration circuit 70 includes a 1-to-(m+1) power divider 72, which is connected to the external signal generator 71, a plurality of directional couplers 76*a*, . . . , 76*m*, and a plurality of receivers 77*a*, . . . 77*m*, all of which are in communication with a signal constructor controller 80. The directional couplers 76*a*, . . . 76*m* are each fabricated as first and second transmission links that are arranged in parallel and are set close enough together such that energy passing through one is coupled to the other. When employed in this manner, the directional couplers 76*a*, . . . 76*m* simultaneously inject the RF pilot signal into the signals captured by the antennas 42*a*, . . . 42*m* and processed by the plurality of receivers 77*a*, . . . 77*m*.

The second antenna array 50 includes the second plurality of antennas 52*a*, . . . 52*n*, wherein 'n' represents the numerical quantity of the second plurality of antennas 52. The second plurality of antennas 52*a*, . . . 52*n* are all electrically connected to the calibration circuit 70. The calibration circuit 70 includes a 1-to-(n) power divider 74, a plurality of directional couplers 75*a*, . . . , 75*n*, and a plurality of receivers 73*a*, . . . 73*n*, all of which are in communication with the signal constructor controller 80. The directional couplers 75*a*, . . . 75*n* are each fabricated as first and second transmission links that are arranged in parallel and are set close enough together such that energy passing through one is coupled to the other. When employed in this manner, the directional couplers 75*a*, . . . 75*n* simultaneously inject the RF pilot signal into the signals captured by the antennas 52*a*, . . . 52*n* and processed by the plurality of receivers 73*a*, . . . 73*n*.

The external signal generator 71 generates and conducts the RF pilot signal to the 1-to-(m+1) power divider 72. The 1-to-(m+1) power divider 72 divides the RF pilot signal into m+1 signals that are transferred to the first plurality of antennas 42*a*, 42*m* of first antenna array 40, and also generates a second electrical power signal that is transferred to the 1-to-(n) power divider 74 via the hinged power transformer 60 and a phase control circuit 90. The 1-to-(n) power divider 74 divides the second electrical power signal into n signals that are transferred to the second plurality of antennas 52*a*, . . . 52*n* of the second antenna array 50.

In some cases, due to various design constraints, the calibration signal (local oscillator/LO signal) being split between the first and second power dividers 72, 74 is too weak to be received by the second power divider 74. In such cases, the signal may need to be amplified. An amplifier introduces an unknown phase offset. The phase control circuit 90 includes a selectable phase-locked loop circuit to address the unknown phase offset during the calibration process.

Figure 4:
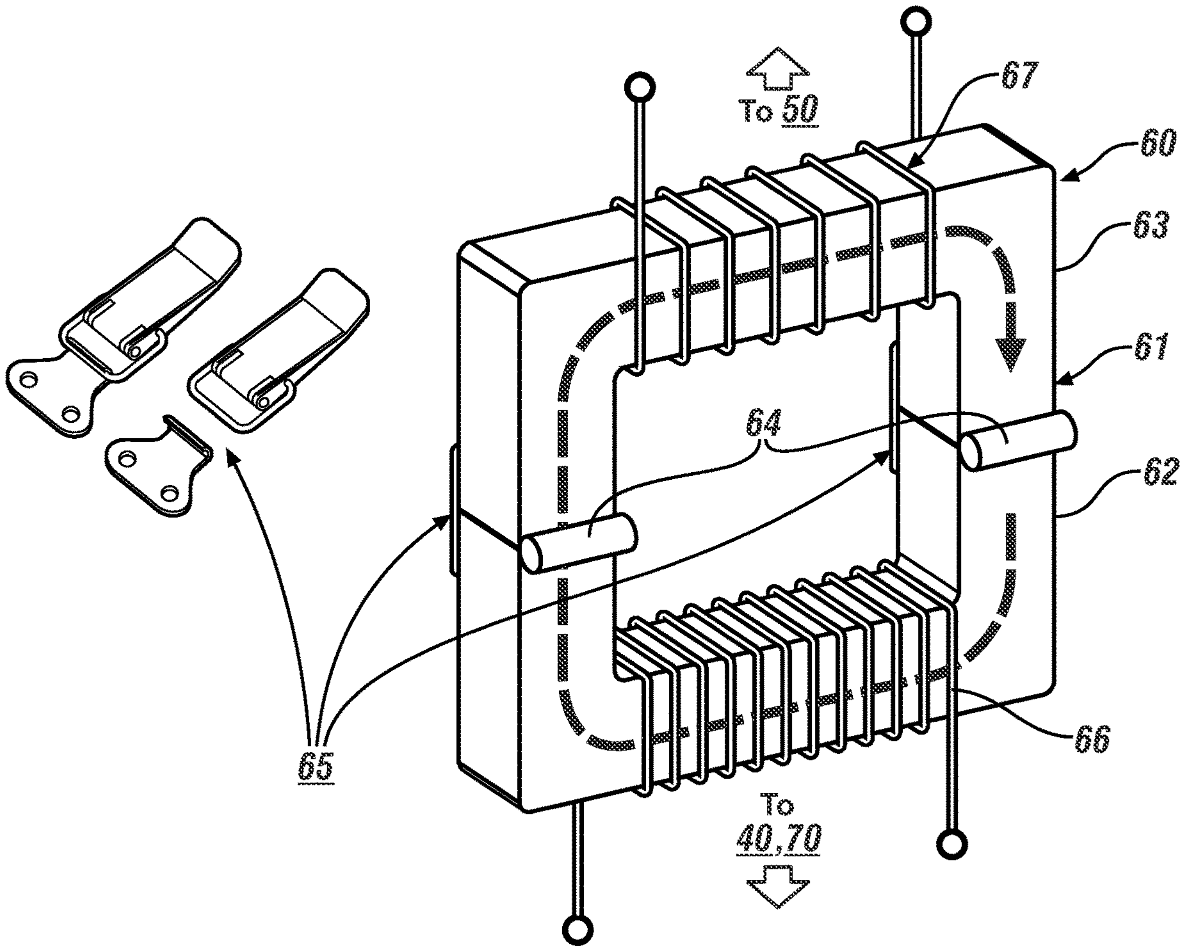
FIGS. 4 and 5 schematically illustrate embodiments of a hinged power transformer that may be employed on an embodiment of the 3D antenna assembly, in accordance with the disclosure.

FIG. 4 schematically illustrates an embodiment of the hinged power transformer 60 that may be employed on an embodiment of the 3D antenna assembly 30 described herein. The hinged power transformer 60 includes a sectioned ferrite core 61 including a first end 62 and a second end 63, wherein the first and second ferrite end 62, 63 are joined by hinges 64 and locking mechanisms 65. Primary windings 66 composed as Np turns and originating from the calibration circuit 70 and the first antenna array 40 are shown on the first end 62 of the sectioned ferrite core 61, and secondary windings 67 composed as Ns turns and coupled to the second antenna array 50 are shown on the second end 63 of the ferrite core 61.

Figure 5:
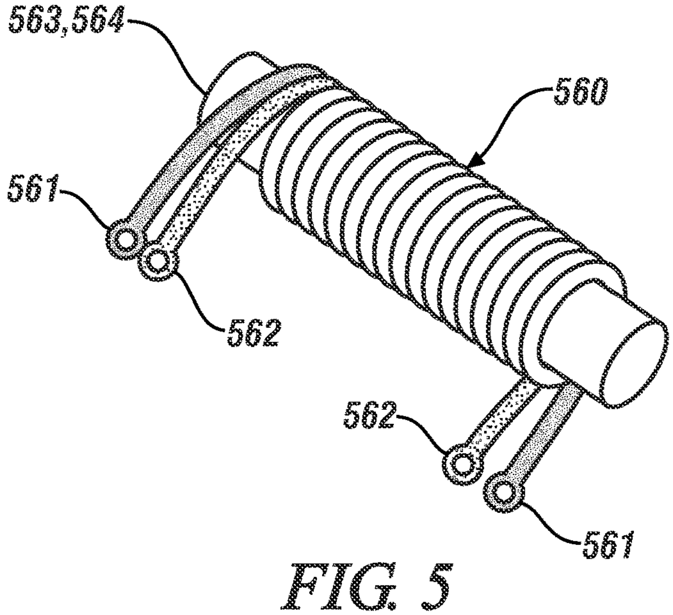

FIG. 5 schematically illustrates an embodiment of the hinged power transformer 560 that may be employed on an embodiment of the 3D antenna assembly 30 described with reference to FIG. 2. The hinged power transformer 560 is arranged with primary windings 561 and secondary windings 562, wherein the primary windings 561 and the secondary windings 562 are arranged in parallel and spirally wound around a common core element 563. The common core element 563 may be cylindrically-shaped, and is arranged to operate as a hinge 564. In one embodiment, the common core element 563 is fabricated from a ferritic material, e.g., steel. In one embodiment, the common core element 563 is fabricated from a non-ferritic material, e.g., a polymer. In one embodiment, the primary windings 561 are composed as Np turns and the secondary windings 562 are composed as Ns turns. In one embodiment, the Np turns of the primary windings 561 are equivalent to the Ns turns of the second windings 562.

A radar calibration process includes one or a plurality of algorithms that are executed in or through the signal constructor controller 80 to control elements of the calibration circuit 70 and the radar system 20 to dynamically calibrate the radar system 20 during ongoing operation thereof. The radar calibration process includes generating, via the external signal generator 71, the RF pilot signal, and conducting the RF pilot signal to the first plurality of antennas 42*a*, . . . 42*m* and the second plurality of antennas 52*a*, . . . , 52*n* during a portion of quiet periods. The RF pilot signal is injected, simultaneously, using first and second power dividers 72, 74, to all the receive channels 77, 73 of the antenna arrays 40, 50. The injection of the RF pilot signal into each of the channels is accomplished using directional couplers 76, 75. The RF pilot signal may undergo different delays and attenuations in the receive channels of the antenna array due to imbalances in the circuitry of the receive channels that may be caused by manufacturing variations, aging, temperature, etc. When the RF pilot signal is a continuous sine wave (CW), a delay difference between the channels that is shorter than one cycle of the RF pilot signal is manifested as a phase offset and a variation in signal gain. The phase offset can be estimated with respect to a reference channel, which is one of the receive channels. The calibration process includes introducing adjustments to gain and phase offset for each of the receive channels to eliminate the effect of the delays and attenuations between the channels, thus enabling coherent signal reception in a signal constructor controller of the on-vehicle radar system 20 related to location and trajectory of vehicles, pedestrians and other objects proximal to the vehicle 10.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The teachings may be described herein in terms of functional and/or logical block components and/or various processing steps. Such block components may be composed of hardware, software, and/or firmware components that have been configured to perform the specified functions. Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An antenna array system, comprising:

a phased array antenna including a first antenna array and a second antenna array, a calibration circuit, and a hinged power transformer;

wherein the calibration circuit is electrically connected to the first antenna array;

wherein the first antenna array is electrically coupled to the second antenna array via the hinged power transformer;

wherein the hinged power transformer mechanically joins the first antenna array to the second antenna array in one of a first position and a second position; and wherein the first antenna array is disposed at an angle in relation to the second antenna array when the hinged power transformer is disposed in the first position.

2. The antenna array system of claim 1, wherein the first antenna array is disposed in a horizontal plane and the second antenna array is disposed in a vertical plane when the hinged power transformer is disposed in the first position.

3. The antenna array system of claim 1, wherein the hinged power transformer electrically couples the first antenna array to the second antenna array when the hinged power transformer is disposed in the first position.

4. The antenna array system of claim 3:

wherein an external signal generator generates a pilot signal;

wherein the pilot signal is fed to the first antenna array; and wherein the hinged power transformer conducts the pilot signal to the second antenna array when the hinged power transformer is disposed in the first position.

5. The antenna array system of claim 4, wherein the pilot signal comprises a short-term radiofrequency (RF) pilot signal having a continuous sine wave.

6. The antenna array system of claim 1, wherein the hinged power transformer includes a primary winding, a secondary winding, and a ferrite core.

7. The antenna array system of claim 6, wherein the ferrite core includes a first end and a second end, when the first end is coupled to the second end via a hinge.

8. The antenna array system of claim 7, wherein the primary winding is arranged on the first end of the ferrite core, and the secondary winding is arranged on the second end of the ferrite core.

9. The antenna array system of claim 1, wherein the hinged power transformer includes a primary winding and a secondary winding, wherein the primary winding and the secondary winding are arranged in parallel and spirally wound around a common core element.

10. The antenna array system of claim 9, wherein the hinged power transformer includes a non-ferrite core.

11. The antenna array system of claim 9, wherein the primary winding is arranged to rotate on the common core element in relation to the secondary winding.

12. The antenna array system of claim 1, wherein the hinged power transformer includes a plurality of primary windings having a first quantity of turns, and a plurality of secondary windings having a second quantity of turns.

13. The antenna array system of claim 12, wherein the first quantity of turns is equal to the second quantity of turns.

14. The antenna array system of claim 1, wherein the calibration circuit comprises:

a first power divider coupled, via a first directional coupler, to the first antenna array; and a second power divider coupled, via a second directional coupler, to the second antenna array.

15. The antenna array system of claim 1, further comprising a controller in communication with the calibration circuit;

wherein the controller is arranged to inject, via the calibration circuit, a pilot signal into the first antenna array and into the second antenna array.

16. A three-dimensional (3D) antenna array system, comprising:

a phased array antenna including a first antenna array and a second antenna array, a calibration circuit including an external signal generator, a hinge, and a hinged power transformer;

wherein the hinge mechanically joins the first antenna array to the second antenna array in one of a first position and a second position;

wherein the first antenna array is disposed at an angle in relation to the second antenna array when the hinged power transformer is disposed in the first position;

wherein the external signal generator is electrically connected to the first antenna array; and wherein the first antenna array is electrically coupled to the second antenna array via the hinged power transformer.

17. The antenna array system of claim 16, wherein the hinged power transformer electrically couples the first antenna array to the second antenna array when the hinged power transformer is disposed in the first position.

18. The antenna array system of claim 17, wherein the external signal generator generates a pilot signal that is conducted, via the calibration circuit, to the first antenna array; and wherein the hinged power transformer conducts the pilot signal to the second antenna array when the hinged power transformer is disposed in the first position.

19. An antenna array system, comprising:

a phased array antenna including a first antenna array and a second antenna array, a calibration circuit coupled to an external signal generator, a hinge, and a hinged power transformer;

wherein the hinge mechanically joins the first antenna array to the second antenna array in one of a first position and a second position;

wherein the first antenna array is disposed in a horizontal plane;

wherein the second antenna array is disposed in a vertical plane when in the first position;

wherein the second antenna array is disposed in a horizontal plane when in the second position;

wherein the external signal generator is directly electrically connected to the first antenna array; and wherein the external signal generator is electrically coupled to the second antenna array via the hinged power transformer.

20. The antenna array system of claim 19:

wherein the external signal generator generates a pilot signal that is injected to the first antenna array; and wherein the hinged power transformer propagates the pilot signal to the second antenna array when the second antenna array is disposed in the first position.

* * * * *